US012747038B1

(12) United States Patent
Allison

(10) Patent No.: US 12,747,038 B1
(45) Date of Patent: Sep. 29, 2026

(54) LOOP HEAT PIPE FOR STAGED REENTRY SPACECRAFT

(71) Applicant: Government of the United States as represented by the Secretary of the Air Force, Wright-Patterson AFB, OH (US)

(72) Inventor: Jonathan Allison, Albuquerque, NM (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 645 days.

(21) Appl. No.: 17/987,941

(22) Filed: Nov. 16, 2022

Related U.S. Application Data

(60) Provisional application No. 63/324,167, filed on Mar. 28, 2022, provisional application No. 63/291,985, filed on Dec. 21, 2021.

(51) Int. Cl.

| | |
|---|---|
| ***B64G 1/50*** | (2006.01) |
| ***F28D 15/02*** | (2006.01) |
| ***F28D 15/04*** | (2006.01) |
| ***F28D 15/06*** | (2006.01) |
| ***F28D 21/00*** | (2006.01) |

(52) U.S. Cl.
CPC ......... *B64G 1/506* (2013.01); *F28D 15/0266* (2013.01); *F28D 15/06* (2013.01); *F28D 15/04* (2013.01); *F28D 2021/0021* (2013.01)

(58) Field of Classification Search
CPC ..... B64G 1/506; F28D 15/0266; F28D 15/06; F28D 15/04; F28D 2021/0021; F28D 15/0275; F28D 15/0283
See application file for complete search history.

(56) References Cited

U.S. PATENT DOCUMENTS

| | | | | |
|---|---|---|---|---|
| 4,880,185 | A * | 11/1989 | Apfel | B64G 1/26 244/135 B |
| 5,419,135 | A | 5/1995 | Wiggs | |
| 10,081,446 | B2 | 9/2018 | Stone | |
| 2017/0234623 | A1 | 8/2017 | Fried | |
| 2020/0216199 | A1* | 7/2020 | Cosner | B64G 1/643 |

(Continued)

OTHER PUBLICATIONS

Hongxing, Development and on-orbit operation of loop heat pipes on chinese circumlunar return and reentry spacecraft, Journal of Mechanical Science and Technology 31 (6), Aug. 25, 2016, p. 2597-2605, Beijing Key Laboratory of Space Thermal Control Technology, China Academy of Space Technology, Beijing 100094, China.

*Primary Examiner* — Len Tran
*Assistant Examiner* — Kamran Tavakoldavani
(74) *Attorney, Agent, or Firm* — AFMCLO/JAZ; Matthew D. Fair

(57) ABSTRACT

A frangible loop heat pipe provides a passive heat transfer system in a staged spacecraft having one or more separable modules. The frangible loop heat pipe is positioned within adjacent separable modules and is designed to separate such that a primary element remains with the command module of the spacecraft and a secondary element is jettisoned with an expendable module. The primary element operates as a flash evaporator that provides heat transfer to the module as heat pipe fluid is ejected from the heat pipe.

19 Claims, 8 Drawing Sheets

(56) References Cited

U.S. PATENT DOCUMENTS

| | | | | |
|---|---|---|---|---|
| 2022/0341678 | A1* | 10/2022 | Salter | F28D 21/00 |
| 2023/0166872 | A1* | 6/2023 | Keune | B64G 1/402<br>244/159.1 |

* cited by examiner

Test of On-Orbit Operation

Test of Shutdown

LOOP HEAT PIPE FOR STAGED REENTRY SPACECRAFT

Pursuant to 37 C.F.R. § 1.78 (a) (4), this application claims the benefit of and priority to prior filed Provisional Application Ser. No. 63/324,167, filed Mar. 28, 2022 and to prior filed Provisional Application Ser. No. 63/291,985, filed Dec. 21, 2022, which is expressly incorporated herein by reference.

RIGHTS OF THE GOVERNMENT

The invention described herein may be manufactured and used by or for the Government of the United States for all governmental purposes without the payment of any royalty.

TECHNICAL FIELD

The present disclosure generally relates to a loop heat pipe and more particularly, but not exclusively to a loop heat pipe for use as a heat transfer device in a staged reentry spacecraft.

BACKGROUND

Space vehicles such as space probes or satellites and the like have unique cooling and heating requirements. The physical size and weight of the heat transfer devices must be minimized to permit low cost launch capability. Further complications to the heating and cooling systems exist for spacecraft that have staged modules that break away at predetermined times during the flight. Some existing systems have various shortcomings, drawbacks, and disadvantages relative to certain applications. Accordingly, there remains a need for further contributions in this area of technology.

SUMMARY

One embodiment of the present disclosure includes a unique loop heat pipe for managing heat in space vehicle systems. Other embodiments include apparatuses, systems, devices, hardware, methods, and combinations wherein a loop heat pipe is configured to provide heat transfer in a space vehicle that includes breakaway modules. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
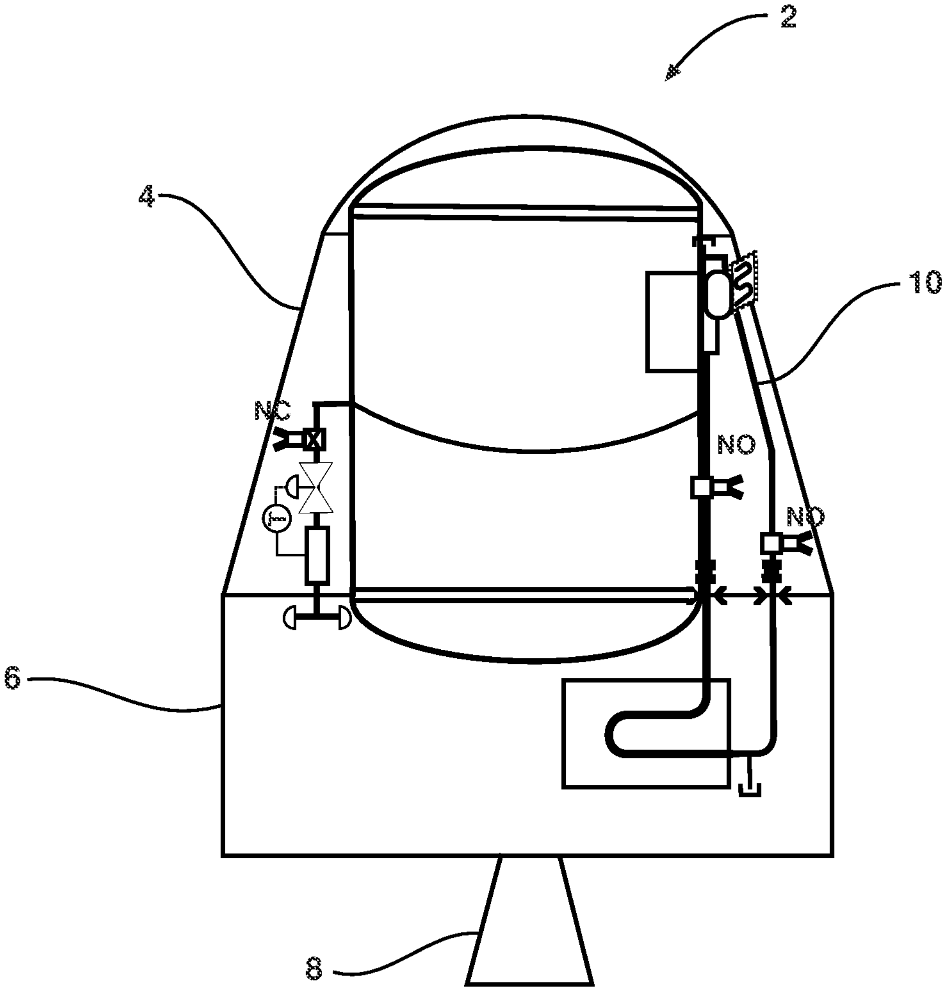
FIG. 1 is a schematic illustration of a staged spacecraft containing a frangible loop heat pipe (LHP)

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

The present application is directed to a passive (i.e. no pump) thermal control system to provide cooling to a human spacecraft. The inventive system includes a heat transfer device that combines the functions of a Loop Heat Pipe (LHP) and a Flash Evaporator (FE). The LHP and the FE can both use ammonia (or a similar fluid) to operate as designed to provide cooling to a spacecraft in different phases of a space mission. This device may be retrofitted into existing space-qualified hardware to provide capabilities that are critical to the function of a thermal control subsystem for human spacecraft. These capabilities include, but are not limited to steady-state cooling on-orbit via LHP and transient cooling during reentry via a flash evaporator; thermostatic control to set a temperature of the compensation chamber (CC); frangibility for spacecraft staging, optional non-propulsive venting; ground testability and reusability. The inventive device permits human exploration of space without the use of unreliable (and thus potentially unsafe) fluid pumps.

In one form, the present application is directed to a passive thermal control subsystem (TCS) for a spacecraft requiring staging and/or earth reentry capability that may be used for human transportation in spacecraft or space planes. Passive thermal control subsystems (TCS) eliminate the need for expensive, bulky, heavy, and unreliable actively pumped fluid loops (PFLs).

PFLs for cooling staged reentry vehicles typically include centrifugal pumps, accumulator(s), cold plates (heat exchangers), filters, sensors that measure temperature, pressure, motor speed, and accumulator level. The pump(s) operate with bearings lubricated by the heat transfer fluid. Thus the pump(s) must be custom designed for one fluid type, one flow rate, one pressure drop, and one operating speed. An accumulator provides or accepts fluid as PFL operating temperature changes and the fluid changes volume. The temperature, pressure, motor speed, and accumulator level sensors are required to control the PFL and monitor its health. Fill and Drain Valves (F&DV) are needed for ingress and egress of the heat transfer fluid. Filters are required for cleaning the system of debris. A control system is required to adjust pump speeds, valve settings and heater settings to achieve desired operating temperatures. The components required for an operational PFL are heavy expensive and are prone to failure.

The teachings of the present disclosure overcomes these deficiencies as the heat transfer system is passive and not actively pumped. The passive system includes a loop heat pipe (LHP) with a condenser, liquid line, vapor line, evaporator having a primary wick and an integral compensation chamber (CC) having a secondary wick. In some embodiments metallic flexible hoses can be used to take care of thermal expansion, installation and other component movement. The evaporator and CC assembly is located at least as high as the highest heat source in a heat pipe network, where the 'height' is measured relative to a ground test gravitational orientation. This ensures that the heat pipe network is always carrying heat up during ground test, to insure ground testability. The heat pipe network is positioned at least partially internal to the pressure vessel such that it picks up both electronic and metabolic heat. The heat pipes can include grooved wicks that have the capacity to carry substantial amounts of heat over the distance of a typical space capsule, but which are not well-suited to carrying heat down in a gravitational test environment. In one aspect the heat pipe of the present invention includes wick dimensions (10 um) that are significantly smaller in comparison to grooved heat pipes in the heat pipe network (nearly 1 mm). These relative dimensions facilitate wicking of the fluid against gravity for the entire required distance.

A CC thermal radiator can include one or more heaters operably coupled to a thermostatic control via closed loop control system with a temperature sensor on the evaporator of the LHP-FE. In this manner, the CC can use the radiator to provide a cold bias and the heater(s) to provide a hot bias to the spacecraft system.

Shaped charges on both the liquid and vapor lines can be used to sever the LHP-FE into two pieces to permit staging of the spacecraft at a seam between mission phases (e.g. when preparing for planetary entry). A temperature-regulated proportional flow control valve (PFCV) can be connected on the vapor line, on the reentry vehicle (RV) side of the shaped charges and a normally open squib valve is operably connected on the liquid line on the RV side of the shaped charges. A squib is a small explosive device used in space operation to perform operations like blasting explosive bolts apart to permanently open or close a squib valve.

There are two types of squib valves: normally open (e.g. open until you fire the squib and permanently closed afterward) and normally closed (e.g. closed until you fire the squib and permanently open afterward). Squib valves can only be switched a single time, but are very reliable, and not inclined to leak due to their robust construction. As a result, they can be used to make a one-time switch between two different hydraulic configurations, typically at the seam between two phases of a space mission. In one form, the squib valves are used to convert the LHP from a closed-loop system to provide continual cooling of a moderate amount of heat during on-orbit operations into an open-ended system to provide short term cooling of a high heat load during reentry. The PFCV regulates flow out of the RV-half of the LHP during reentry and the squib valve shuts off the liquid line from flowing during reentry.

The PFCV is controlled by temperature sensor(s) located on the LHP-FE evaporator or proximate the payload. In one embodiment, a flash evaporator heat exchanger (FEHX) is located downstream of the PFCV and is in thermal communication with a human-safe heat pipe network within the spacecraft's pressure vessel.

During on-orbit operation of the LHP-FE, the fluid flowing through the LHP-FE's side of the heat exchanger is a saturated vapor, the heat transfer it receives causes the vapor to superheat. This theoretically causes a mild parasitic on the performance of the radiator in that a section of that radiator must provide the cooling to remove the superheat prior to the condensation process. The FEHX is ideally located at least as high as the highest heat source in whatever ground test is used to verify FEHX performance as well as at least as high in the reentry orientation is required to provide sufficient static head to drive sufficient flow for providing cooling. The CC is sized to provide sufficient fluid for all of the reentry phase or sufficient operational margin across all temperature ranges while on-orbit, whichever is larger. The reentry phase sizing is likely to dominate, and thus the CC will be larger than a CC for an LHP-FE that is not required to provide cooling during reentry.

The CC's temperature is regulated by thermally connecting to a dedicated thermal radiator. This dedicated radiator permits the CC to run cold, which in combination with heaters mounted on either the CC or the radiator allows the CC's temperature to be controlled to a preferred set point. This design reduces energy that would be required if the entire primary radiator of the spacecraft had to be sized to provide makeup heat to regulate thermal control in all environments.

Beam seal joints are located on the RV side of both the liquid and the vapor lines above the PFCV and squib valve. Beam seals are high reliability mechanical seals. Beam seals permit reuse of the reentry vehicle, for spacecraft having such requirements, but are not required if the spacecraft will not be reused. High and low point F&DVs permit initial charging of the fluid as well as recharging of the fluid in the reassembled LHP-FE.

During on-orbit operation, saturated vapor receives heat transfer from the attached heat pipe network which tends to raise its temperature slightly. Additionally, some pressure drop is incurred through the FEHX. Partial condensation within the FEHX would cause a saturated mixture to be in the vapor line from the FEHX to the condenser and have a saturated mixture in the condenser from the inlet of the condenser, rather than starting as a mildly superheated vapor as in typical LHP designs. This difference is not necessarily of concern, as the vapor line diameter can be larger than the liquid line diameter, meaning that extra condensate in the vapor line will not yield unacceptable pressure drops in the system. However, this will have the net effect of drawing more liquid out of the CC. Thus, the CC is designed to be capable of providing enough liquid to the LHP to maintain normal operation in all credible operating conditions. If a situation occurs during on-orbit operation where there is no significant heat transfer into the FEHX then the pressure drop could cause the dry vapor to partially condense.

Flow then progresses through the vapor-side beam seal. In both on-orbit and reentry operating modes, the fluid is a vapor and the flow rate is sufficient to provide cooling to the spacecraft, which makes the flow rates in both cases about equal. Flow then progresses through tubing that has the shaped charges around it. During on-orbit operation, there is no impact to the flow due to the shaped charges since the shaped charges are externally located to the pipe. During reentry the shaped charges have already been fired and the vapor is vented to space in a regulated way through the PFCV and FEHX.

In the on-orbit application, the flow travels to the condenser where it condenses and is subcooled. At the end of the condenser, the flow can switch to a smaller diameter tube, as the denser liquid requires less flow area to maintain manageable pressure drops.

The flow progresses up through the shaped charge on the liquid line and then progresses through the normally open squib valve. The normally open squib valve is open during on-orbit operation which permits unimpeded flow of liquid from the condenser to the evaporator. During reentry operation, the squib valve is closed which prevents fluid from leaking out the back of the LHP-FE where it would be unavailable to provide useful and regulated cooling at the FEHX. The fluid then progresses up to the top of the LHP-FE where the top F&DV is located and finally, the liquid line connects into the CC where the loop is complete.

One preferred fluid for use in the LHP is ammonia because of its excellent thermal properties, an optimal heat pipe performance at about 15 C and its high vapor pressure which permits it to act as a coolant in the flash evaporator all the way down to sea level pressure. Other fluids used in the LHP can include, but are not limited to water, ethylene-glycol water, propylene-glycol water, refrigerants, and fluoropolymers.

In on-orbit operation, the LHP-FE is started up by driving liquid from the compensation chamber into the evaporator. This process begins by heating up the compensation chamber with heaters on the CC. Circulating flow is established when the CC temperature warmer than the evaporator such that liquid flows into the evaporator. When startup occurs, differential temperatures of the evaporator and condenser decrease significantly and fairly rapidly. The set point of the CC heater(s) can be adjusted to set the desired operating temperature for the CC, which will be somewhat lower than the evaporator, which in turn will be lower than the electronics and cabin air temperature.

In reentry operation, the LHP-FE may optionally be shut down. The CC heaters are set to heat the CC to a higher temperature than the rest of the LHP-FE, thus shutting down flow in the LHP-FE. The PFCV can then be closed with a squib valve.

The PFCV can be controlled by an electronic controller using a temperature sensor to achieve the set point temperature of the FEHX. The FEHX is physically distinct from the evaporator and represents another location through which the system receives heat and through which the heat pipe network delivers heat to the LHP-FE. The closed off squib valve prevents flow out of the back of the LHP-FE. The liquid stored in the remaining part of the LHP-FE is available for use as an evaporative coolant. This fluid is located primarily in the CC, but also secondarily in the evaporator and the piping between the squid valve and the PFCV.

The vapor pressure of the fluid acts as the pressurant to drive flow out the system. Additionally, the atmospheric pressure, being lower than the pressure within the LHP-FE, provides suction to remove the fluid.

After the end of the mission, the beam seals can be separated such that the half of the beam seal that is connected to the separated tubing can be discarded and a new condenser section with attendant beam seal fittings can be fitted onto the remaining (evaporator) half of the LHP-FE. The standard fill process can then be executed through the F&DVs. Thus the LHP-FE can be refurbished and reused without removing it from the command module. For systems that do not require reuse, the F&DV's can be replaced with a pinch-off fill port that is standard for LHPs and the beam seals can be excluded.

Referring now to FIG. 1, there are illustrated some aspects of a non-limiting example of a staging spacecraft 2 that includes separable modules. The spacecraft 2 includes a first module 4 sometimes called a command module that may be pressurized and suitable for human occupation. A second module 6 sometimes called a service module is suitable for supporting the first module 4 with a propulsion system 8 and/or other features while in space, but which is only needed up to a certain point in the mission, after which it is discarded or jettisoned when the first model 4 returns to earth. While not shown, additional separable modules may form the spacecraft 2 as defined in this application and as those skilled in the art would understand. A frangible loop heat pipe 10 may extend through portions of each module 4, 6 to heat and cool portions thereof as will be described below.

Figure 2:
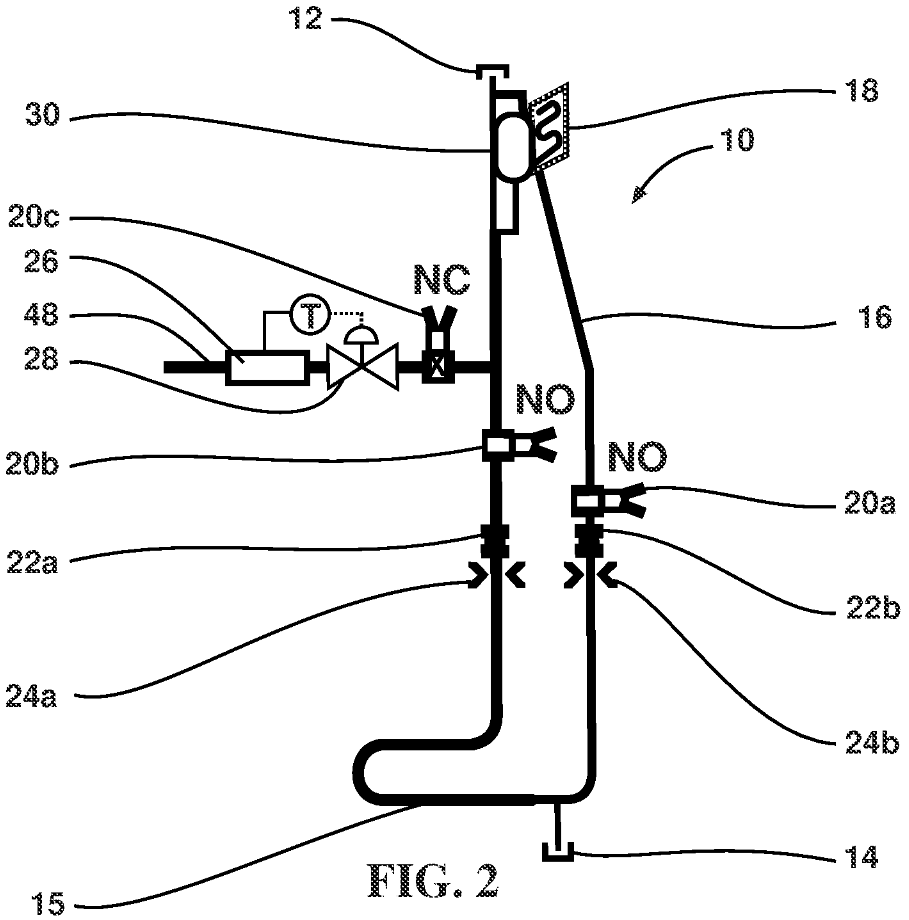
FIG. 2 is a schematic view of a frangible loop heat pipe (LHP) for a staged spacecraft such as the spacecraft shown in FIG. 1, the LHP in FIG. 2 is shown in its configuration prior to the staging event (pre-staging)

Referring to FIG. 2, a schematic view of a frangible loop heat pipe (LHP) 10 in a pre-staging configuration is illustrated. The frangible loop heat pipe 10 includes a first fill/drain valve 12 at one end and a second fill/drain valve 14 at the opposite end of the heat pipe 10. A continuous loop pipe 16 forms a fluid conduit through which a heat transfer fluid traverses therethrough. A first heat exchanger 18, sometimes called an evaporator, can be positioned proximate the first fill/drain valve 12. The first heat exchanger 18 can be a thermal radiator attached to a compensation chamber heater and functions as a thermostat for the thermal control system (TCS) on the LHP 10. A first squib valve 20*a* is normally open (NO) and can be connected to the LHP 10 below the first heat exchanger 18. The first squib valve 20*a* operates to prevent backflow through the LHP 10 when the first squib valve 20*a* is closed post-separation.

First and second beam seal joints 22*a*, 22*b* are positioned on either side of the loop heat pipe 10. The beam seal joints 22*a*, 22*b* enable reuse of the first stage capsule module 4. The second beam seal 22*b* is positioned just below the first squib valve 20*a* and the first beam seal joint 22*a* is positioned on the opposite side of the LHP 10. First and second shaped charges 24*a*, 24*b* are positioned just below the first and second beam seal joints 22*a*, 22*b*. The first and second shaped charges 24*a*, 24*b* are configured to sever the LHP 10 at the beam seal locations 22*a*, 22*b*, respectively when staging (e.g. ejecting module 4) the spacecraft. A second squib valve 20*b* is positioned above the first beam seal joint 22*a*. The second squib valve 20*b* is a normally open valve that provides for isolation of this path post staging in the same manner as the first squib valve.

A pipe extension 48 projects from the LHP 10 above the second squib valve 20*b*. A third squib valve 20*c* is coupled to the pipe extension 48. The third squib valve 20*c* is normally closed and operates as a flash evaporator vapor on/off valve after staging. A second heat exchanger 26 is coupled to an electronic proportional control valve 28 downstream of the third squib valve 20*c* on the pipe extension 48. The second heat exchanger 26 picks up heat from the first module post staging, and therefore must be in thermal communication with hardware in the first module 4. The electronic control valve 28 operates to control the fluid flow rate through the second heat exchanger as a function of a temperature input measured by a temperature sensor T to provide thermostatic regulation of the heat exchanger. The second heat exchanger 26 is a flash evaporator heat exchanger used to cool the spacecraft 2 during reentry into earth orbit. A compensation chamber 30 is positioned between the pipe extension 48 and the first fill/drain valve 12. The compensation chamber 30 holds a heat pipe fluid and is sized to meet reentry cooling requirements of the flash evaporator system after spacecraft staging. A condenser 15 is positioned proximate the lower end of the LHP 10 adjacent the second fill valve 14. The condenser 15 cools the heat pipe fluid in the LHP 10 such that the fluid changes phase from a gas to at least partially a liquid.

Figure 3:
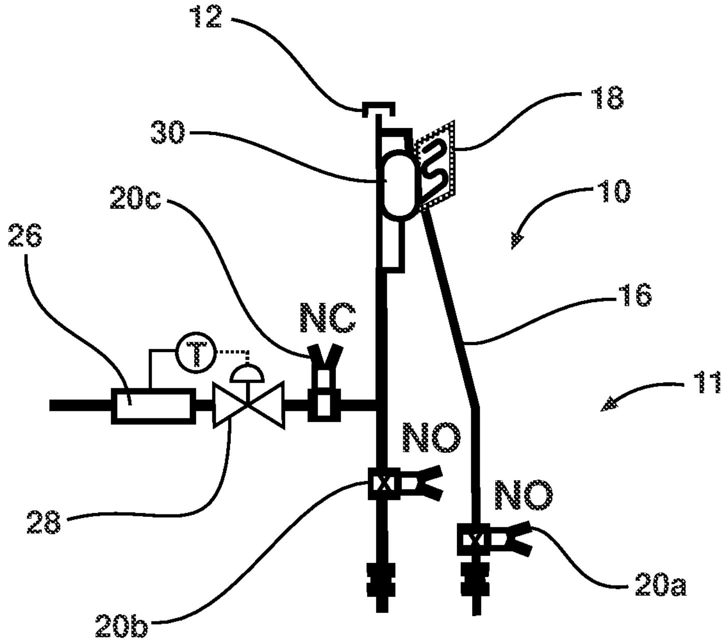
FIG. 3 is a schematic view of the frangible loop heat pipe (LHP) for a staged spacecraft after the staging event (post staging)

Referring now to FIG. 3, the frangible loop heat pipe 10 of FIG. 2 is shown after being severed by the shaped charges 24*a* and 24*b* to form a flash evaporator circuit 11. The flash evaporator circuit 11 provides continued passive thermal control in the first module 4 (see FIG. 1) after the second module has been jettisoned from the spacecraft 2.

Figure 4:
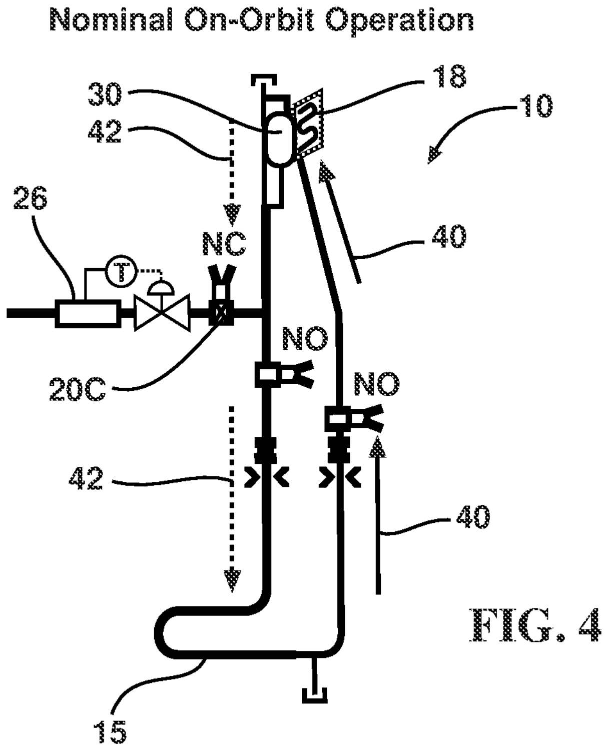
FIG. 4 is a schematic view of a frangible loop heat pipe (LHP) for a pre-staging spacecraft showing a nominal operation mode.

FIG. 4 is a schematic illustration of the frangible loop heat pipe 10 showing nominal on-orbit operation of the LHP 10 prior to staging. The normally closed squib valve 20*c* prevents flow through the second heat exchanger 26. The direction of the heat pipe fluid flow is represented by arrows 40 (liquid) and 42 (vapor). In this depicted embodiment the heat pipe fluid flows counter-clockwise, however the fluid may flow clockwise in other embodiments with minor changes in the configuration as one skilled in the art would readily understand. The heat pipe fluid is substantially in liquid form represented by arrows 40 until passing through the first heat exchanger 18 (sometimes called an evaporator) for the compensation chamber radiator and heaters. The heat pipe fluid changes to a vapor phase as represented by arrows 42 and travels downward on the left side of the LHP 10. As the heat pipe fluid cools in the condenser 15 the phase changes back to a liquid and the cycle continues as the liquid is wicked back to the evaporator via the capillary pressure induced by the wick of the first heat exchanger 18.

Figure 5:
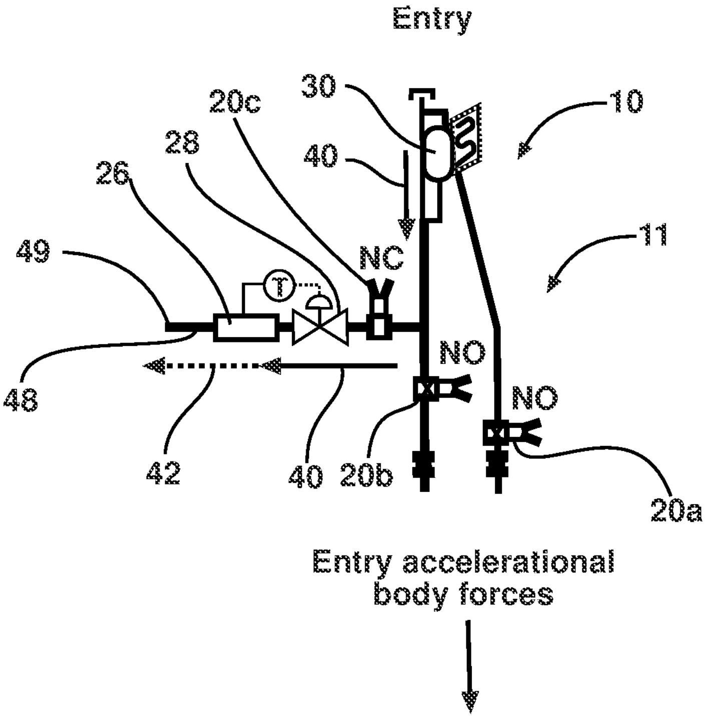
FIG. 5 is a schematic view of the frangible loop heat pipe (LHP) for a post-staging spacecraft showing a reentry operation mode.

FIG. 5 is a schematic illustration of a flash evaporator circuit 11 formed from a post staging frangible loop heat pipe 10. This post staging LHP 10 configuration is operational during reentry to earth's atmosphere where accelerational body forces act on the system. The accelerational body forces cause heat pipe liquid (40) to flow down and out of the compensation chamber 30. The heat pipe fluid (40) then moves through the flash evaporator circuit 11 toward a low pressure atmospheric ejection port 49 at the end of the pipe extension 48. The normally open squib valves 20*a* and 20*b* are closed to prevent heat pipe fluid from passing through in the wrong direction and the normally closed squib valve 20*c* is opened to permit heat pipe fluid to flow into the pipe extension 48. The proportional control valve 28 regulates flow rate of heat pipe fluid into the second heat exchanger 26. The heat pipe fluid flow illustrated by arrow 40 is liquid until it passes through the second heat exchanger 26 of the flash evaporator and changes phase via flashing to a gas as represented by arrow 42. The heat pipe fluid in the flash evaporator 11 vents out of the heat pipe 10 through an ejection vent port 49 in the pipe extension 48 as a gas.

Figure 6:
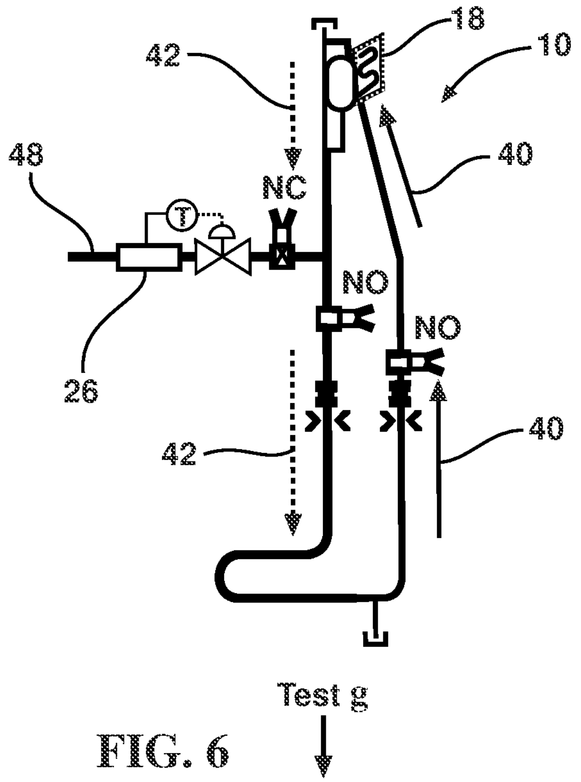
FIG. 6 is a schematic view of the frangible loop heat pipe (LHP) for a pre-staging spacecraft showing a ground test of on-orbit operation.

FIG. 6 is a schematic illustration of the LHP 10 that can be used to test the On-Orbit operation mode on earth. Gravity acts in the direction shown in the figure. The gravitational body force is applied to the LHP 10 and the properties and movement of the heat pipe fluid within the LHP 10 can be measured by temperature sensors as would be known to those skilled in the art. An evaporator wick internal to the evaporator 18 lifts the liquid column against the gravitational force. It should be understood that the gravitational orientation shown in FIG. 6 is the worst-case scenario for operation of the LHP 10, but that the LHP 10 can be designed to function against this body force; thus it will be clear to those skilled in the art that any other gravitational orientation during ground test can be accommodated. The normally closed squib valve 20*c* prevents heat pipe fluid flow through the second heat exchanger 26 in the extension pipe 48. The heat pipe fluid circulates according to nominal on-orbit LHP 10 operation as illustrated by arrows 40 and 42.

Figure 7:
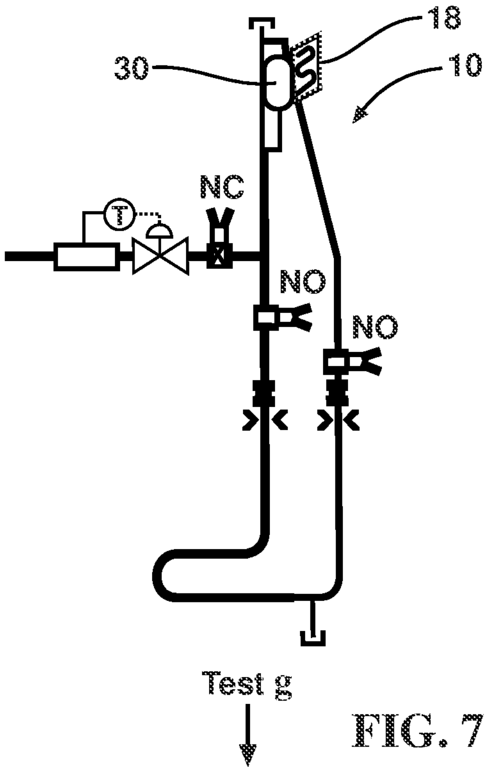
FIG. 7 is a schematic view of the frangible loop heat pipe (LHP) for a pre-staging spacecraft showing a test of shutdown.

FIG. 7 is a schematic illustration of the LHP 10 testing a shut down operation on earth. The compensation chamber heater 18 raises the temperature of the fluid in the compensation chamber 30 enough to disrupt the nominal thermodynamic cycle of the LHP 10 and shut down the LHP 10.

Ground testing of the entry configuration is not simple for two reasons: first most vacuum chambers are not suited to accept quick release of heat transfer fluids into them and second, the squib valves are irreversible and cannot be easily replaced without removing the entire LHP from the system. Thus, ground testing of the entry configuration is best done on a qualification unit that is used once and then disposed of. If demonstration of the actual flight hardware is required then the LHP might incorporate latch valves that can be used to reversibly open/close the LHP or a more complicated arrangement of squib valves that would allow the system to be open and shut twice.

Figure 8:
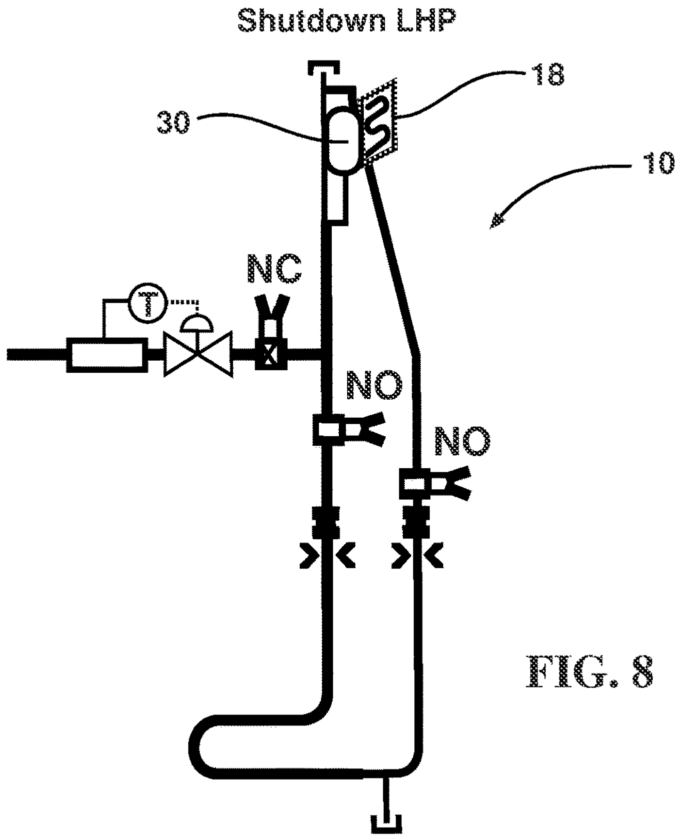
FIG. 8 is a schematic view of the frangible loop heat pipe (LHP) for a pre-staging spacecraft showing a first step of a staging sequence: shutting down the LHP.
Figure 9:
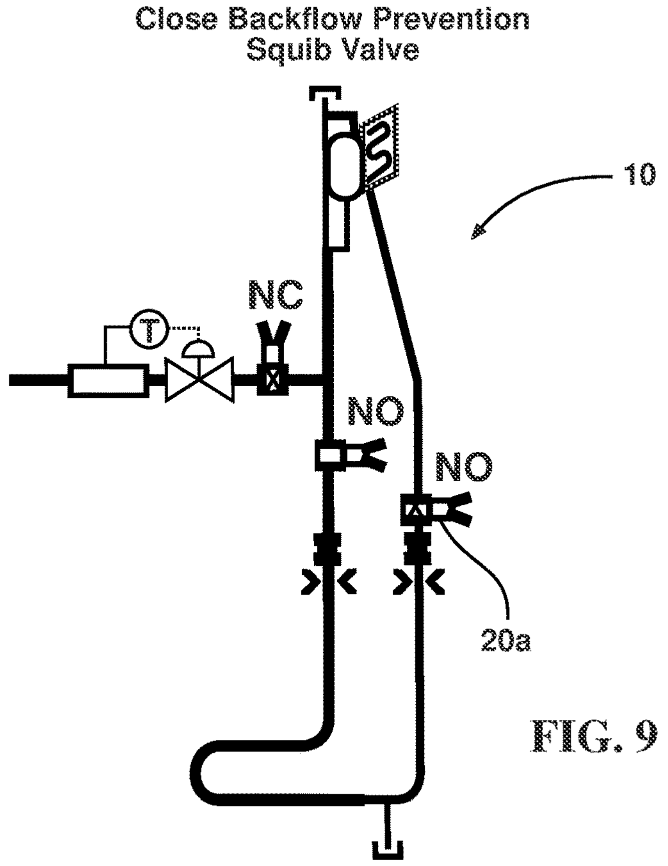
FIG. 9 is a schematic view of the frangible loop heat pipe (LHP) for a pre-staging spacecraft showing a second step of a staging sequence, closing the backflow prevention squib valve.
Figure 10:
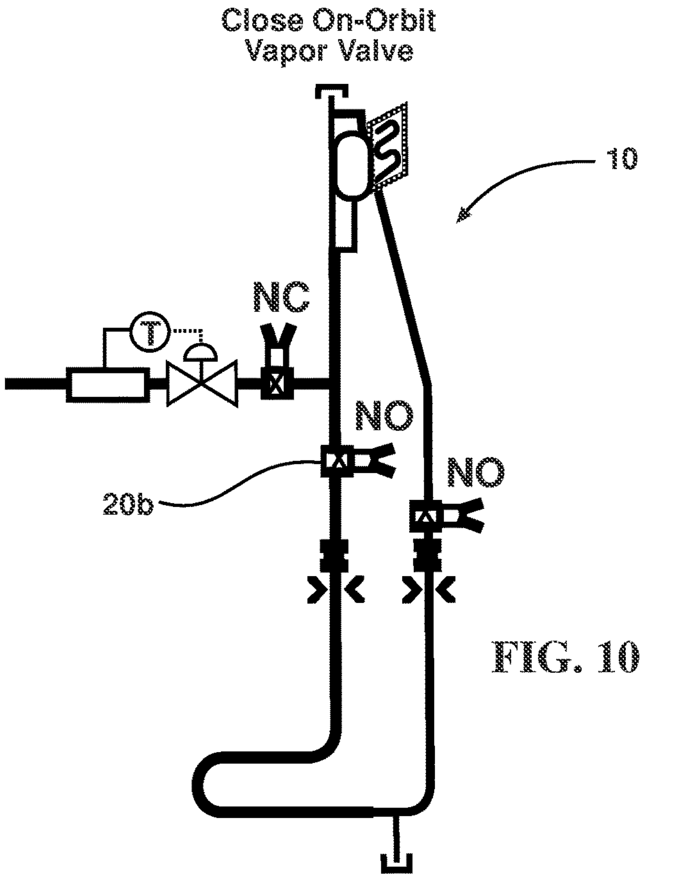
FIG. 10 is a schematic view of the frangible loop heat pipe (LHP) for a pre-staging spacecraft showing a third step of a staging sequence, closing the on-orbit vapor valve.
Figure 11:
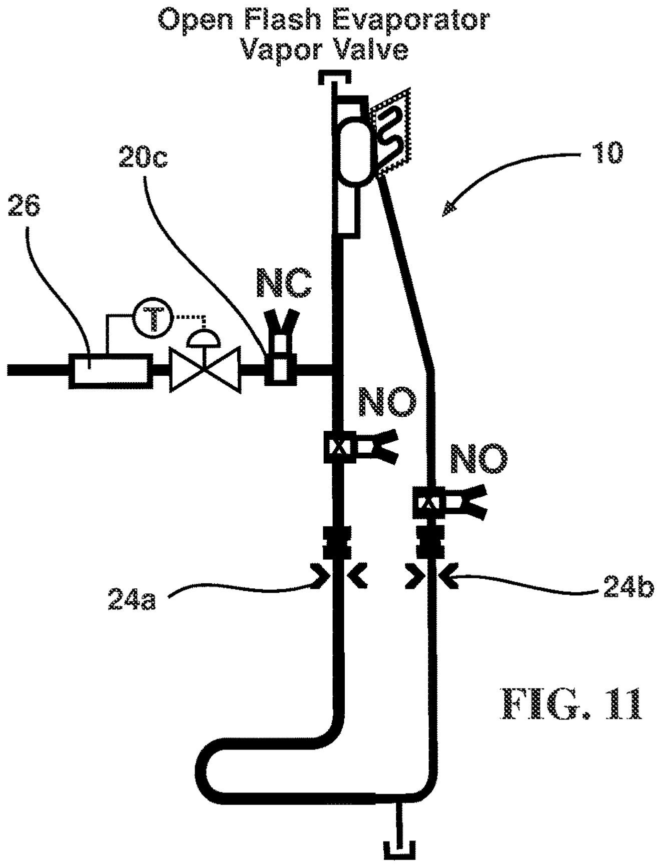
FIG. 11 is a schematic view of the frangible loop heat pipe (LHP) for a pre-staging spacecraft showing fourth step of a staging sequence, opening the flash evaporator vapor valve.
Figure 12:
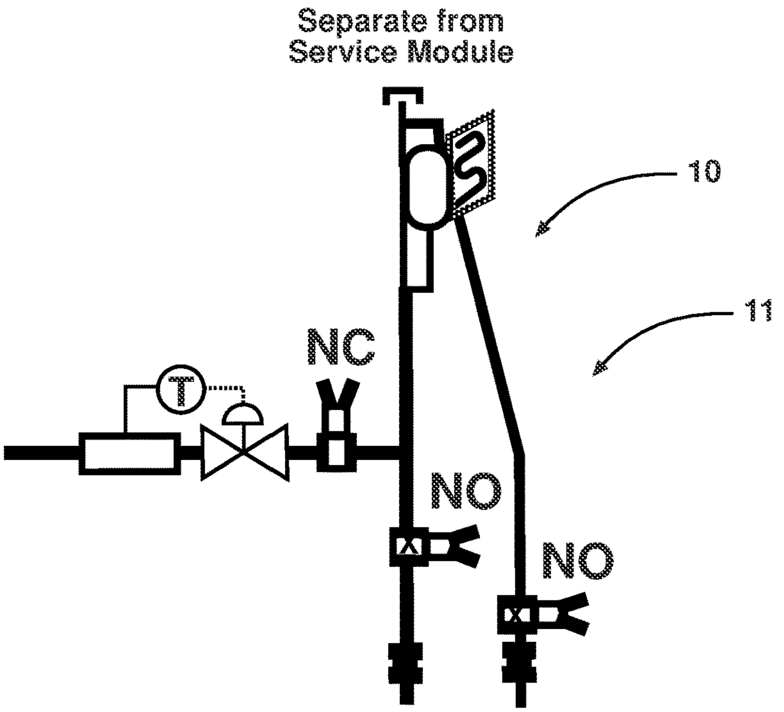
FIG. 12 is a schematic view of the frangible loop heat pipe (LHP) for a post-staging spacecraft for a fifth step of a staging sequence, separating the service module.
Figure 13:
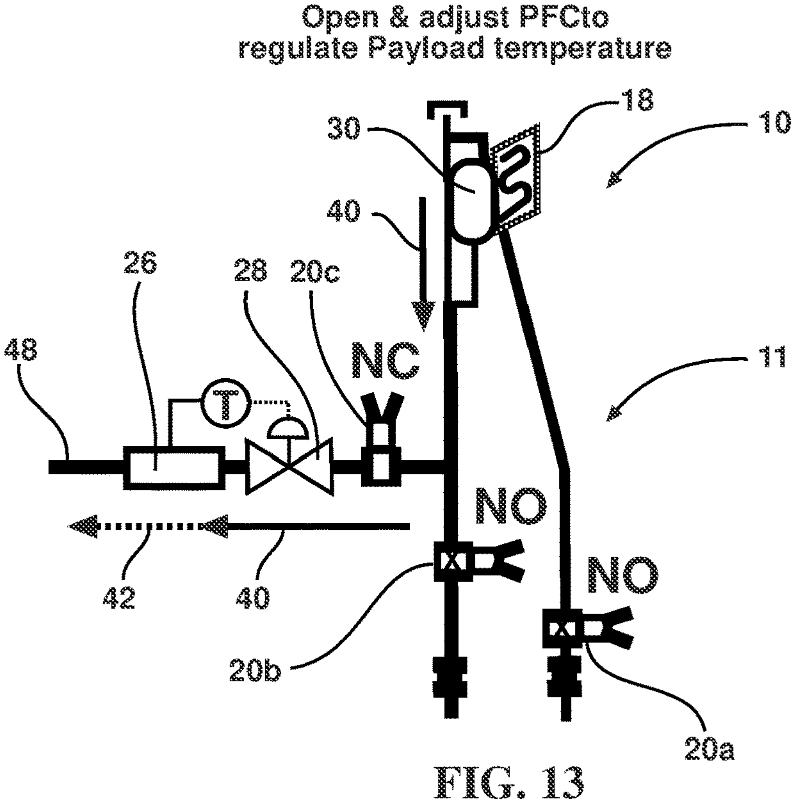
FIG. 13 is a schematic view of the frangible loop heat pipe (LHP) for a post-staging spacecraft showing a sixth first step of a staging sequence, open and adjust the flow control valve to regulate the payload's temperature.

FIGS. 8-13 are views of the LHP 10 in a staging sequence. In general there are no minimum or maximum time requirements or constraints between each event. Step 1 as illustrated by FIG. 8 shuts down the LHP 10. Typically, heat is applied to the compensation chamber 30, however this is not always required if the temperature is high enough to meet a threshold requirement prior to step 2. Step 2 illustrated by FIG. 9 closes the back flow prevention squib valve 20*a* to prevent backflow of the heat pipe fluid. Step 3 illustrated by FIG. 10 closes the on-orbit vapor squib valve 20*b* to prevent heat pipe fluid flow therethrough. Step 4 illustrated by FIG. 11 opens the flash evaporator vapor squib valve 20*c* to permit flow through the flash evaporator heat exchanger 26. Step 5 illustrated by FIG. 12 separates the LHP 10 from the service module 6 (See FIG. 1) by firing the shaped charges 24*a* and 24*b* (See FIG. 11). Step 6 illustrated by FIG. 13 opens and regulates the proportional control valve 28 to regulate the payload temperature in the first module 4 (See FIG. 1).

Figure 14:
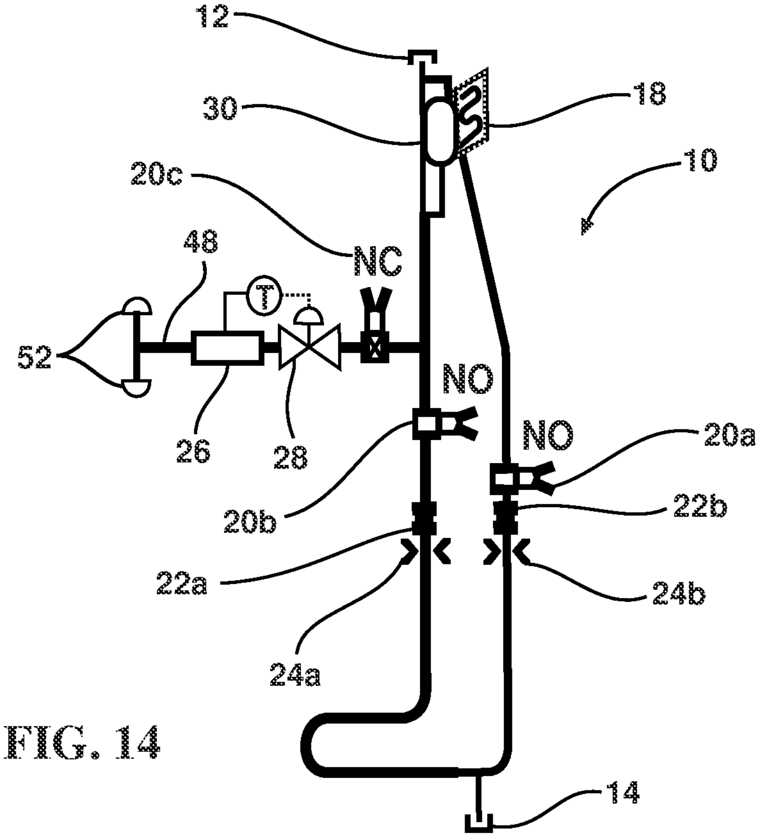
FIG. 14 is a schematic view of a frangible loop heat pipe (LHP) for a pre-staging spacecraft for non-propulsive venting.

FIG. 14 is a schematic illustration of a frangible loop heat pipe 10 according to another embodiment of the present disclosure that is operable to provide non-propulsive venting of the heat pipe fluid. The frangible loop heat pipe 10 of FIG. 14 is similar to that of the previously described embodiments. However, in this embodiment a pipe extension 48 includes dual reaction off setting vents 52 to eject the heat pipe fluid as a vapor without applying a net force or moment to the spacecraft. The dual ejection vents 52 cause a net zero reaction thrust so that the space module 4 need not account for a thrust caused by the ejection of the heat pipe fluid from the module 4.

Figure 15:
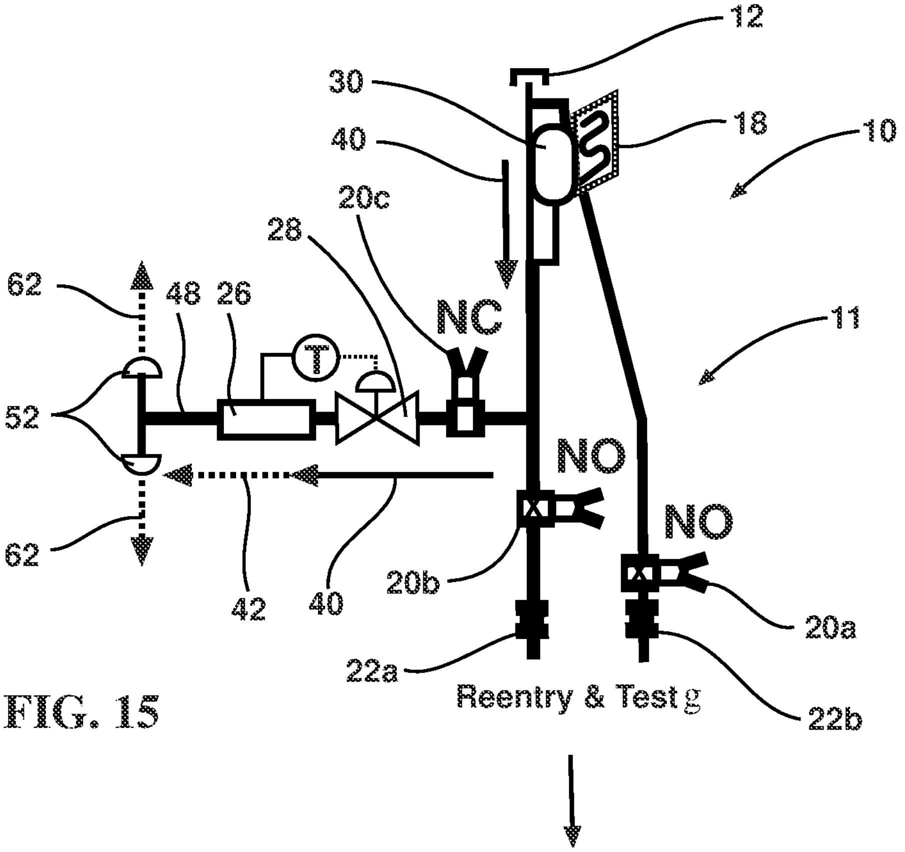
FIG. 15 is a schematic view of the frangible loop heat pipe (LHP) for a post-staging spacecraft showing an operation mode for non-propulsive venting.

FIG. 15 depicts the frangible loop heat pipe 10 shown after staging as a flash evaporator 11. After the second module 6 has been jettisoned, the temperature of the command module 4 can be controlled by the flash evaporator circuit 11. The flow of liquid heat pipe fluid depicted by solid arrow 40 moves from the compensation chamber 30 past the control valve 28 and through the second heat exchanger 26. The heat pipe fluid evaporates in the second heat exchanger 26 and continues to flow as a vapor illustrated by dashed arrow 42 through the pipe extension 48. The vapor 42 exhausts through the opposing vents 52. The control valve 28 is operable for controlling the flow rate through the vents 52. Because the two vents 52 face in opposite directions, the net propulsive force and torque due to fluid ejection is zero.

It should be noted that terms relating to position such up, down, above and below, left and right, etc. are viewed relative to the drawings as illustrated. The positional descriptions do not define relative position in absolute terms and may be changed without affecting the teaching of the present application. Other fluidic components such as, but not limited to, filters, pressure transducers, temp sensors, flow restrictors, and parallel flow paths, may also be included within the LHP to provide additional functionalities. Further, the positions may change during operation of the spacecraft 2 in that the attitude and direction relative to a fixed coordinate system may change during flight.

In one aspect, the present disclosure includes a spacecraft system comprising: a spacecraft having a primary module and one or more separable modules connected thereto; a frangible loop heat pipe positioned within the primary module and the one or more separable modules; wherein the frangible loop heat pipe is separable into a primary element and a secondary element; and wherein the primary element remains within the primary module of the spacecraft post staging.

In refining aspects, the primary element is a flash evaporator operable in the primary module post staging; the frangible loop heat pipe includes a continuous fluid passageway having a heat pipe fluid transported therein; the frangible loop heat pipe includes at least two beam seal joints; the frangible loop heat pipe includes at least one squib valve that closes upon separation of the primary and secondary elements; the frangible loop heat pipe includes at least one squib valve that opens upon separation of the primary and secondary elements; the frangible loop heat pipe includes a first heat exchanger for transferring heat to and/or from the pipe fluid; the frangible loop heat pipe includes a compensation chamber operable as a reservoir for holding a portion of the heat pipe fluid for use during operation; wherein the frangible loop heat pipe includes at least one shaped charge configured to sever the loop heat pipe when the modules are separated; wherein the frangible loop heat pipe includes a vent system having a pressure regulator to control a flow rate therethrough; a pipe extension in fluid communication with the heat pipe, the pipe extension being operable after the modules are separated; further comprising a proportional control valve coupled to the pipe extension; further comprising a second heat exchanger coupled to the pipe extension; further comprising a temperature sensor electrically coupled to the second heat exchanger and the proportional control valve; further comprising an exhaust port connected to the pipe extension configured to eject pipe fluid as a flash evaporator; further comprising a pair of opposing vents coupled to the exhaust port; further comprising at least one drain/fill valve fluidly coupled to the loop heat pipe; further comprising a condenser formed with the loop heat pipe.

In another aspect, the present disclosure includes a frangible loop heat pipe comprising: a hollow pipe forming a single loop path for a heat pipe fluid to flow therethrough; a pair of fill/drain valves connected to the loop path at opposing ends thereof; a first normally open squib valve coupled the loop heat pipe on one side; a second normally open squib valve coupled the loop heat pipe on an opposing side; first and second shaped charges coupled to the loop heat pipe proximate the first and second squib valves; first and second beam seal joints positioned in the loop heat pipe between the first and second squib valves, respectively; a first heat exchanger in thermal communication with the loop heat pipe proximate a first end; a compensation chamber connected with the loop heat pipe positioned to receive thermal input from the first heat exchanger; a condenser formed within the loop heat pipe proximate a second end opposite of the first end; an extension pipe in fluid communication with the loop heat pipe, the extension pipe projecting away from the loop heat pipe between the compensation chamber and the second squib valve; a normally closed third squib valve positioned proximate a connection point between the loop path and the extension pipe; a flow control valve positioned downstream of the first squib valve in the extension pipe; a second heat exchanger positioned downstream of the flow control valve in the extension pipe; a temperature sensor in a closed loop connection between the flow control valve and the second heat exchanger; and a dump vent formed in the extension pipe to permit heat pipe fluid to eject therefrom after the loop heat pipe has been severed by the shaped charges.

In a refining aspect, the frangible loop heat pipe further comprises a pair of opposing vents connected to the dump vent to prevent a net thrust force from venting the fluid.

In another aspect, the present disclosure includes a method for transferring heat in staged space vehicle comprising: flowing a heat pipe fluid through a frangible loop heat pipe that is positioned through portions of a primary module and at least one separable module to provide heating and cooling to the space vehicle; severing the loop heat pipe when the at least one separable module is released from the primary module in space; forming a flash evaporator circuit from a portion of the loop heat pipe that remains within the primary module; and controlling a flow rate of heat pipe fluid exhausting from the flash evaporator circuit to transfer heat to and from the primary module.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A spacecraft system comprising:

a spacecraft having a primary module and one or more separable modules connected thereto;

a frangible loop heat pipe positioned within the primary module and the one or more separable modules;

wherein the frangible loop heat pipe is separable into a primary element and a secondary element;

wherein the primary element remains within the primary module and the secondary element of the frangible loop heat pipe breaks away with the one or more separable modules after post staging separation of the spacecraft; and wherein the frangible loop heat pipe includes at least one shaped charge configured to sever the loop heat pipe when the modules are separated.

2. The spacecraft system of claim 1, wherein the primary element is a flash evaporator operable in the primary module post staging.

3. The spacecraft system of claim 1, wherein the frangible loop heat pipe includes a continuous fluid passageway having a heat pipe fluid transported therein.

4. The spacecraft system of claim 1, wherein the frangible loop heat pipe includes at least two beam seal joints.

5. The spacecraft system of claim 1, wherein the frangible loop heat pipe includes at least one squib valve that closes upon separation of the primary and secondary elements.

6. The spacecraft system of claim 1, wherein the frangible loop heat pipe includes at least one squib valve that opens upon separation of the primary and secondary elements.

7. The spacecraft system of claim 1, wherein the frangible loop heat pipe includes a first heat exchanger for transferring heat to and/or from the pipe fluid.

8. The spacecraft system of claim 1, wherein the frangible loop heat pipe includes a compensation chamber operable as a reservoir for holding a portion of the heat pipe fluid for use during operation.

9. The spacecraft system of claim 1, further comprising a pipe extension in fluid communication with the frangible loop heat pipe, the pipe extension being operable after the modules are separated.

10. The spacecraft system of claim 9, further comprising a proportional control valve coupled to the pipe extension.

11. The spacecraft system of claim 10, further comprising a second heat exchanger coupled to the pipe extension.

12. The spacecraft system of claim 11, further comprising a temperature sensor electrically coupled to the second heat exchanger and the proportional control valve.

13. The spacecraft system of claim 9, further comprising an exhaust port connected to the pipe extension configured to eject pipe fluid as a flash evaporator.

14. The spacecraft system of claim 1, further comprising a pair of opposing vents coupled to an exhaust port.

15. The spacecraft system of claim 1, further comprising at least one drain/fill valve fluidly coupled to the loop heat pipe.

16. The spacecraft system of claim 1, further comprising a condenser formed with the loop heat pipe.

17. A frangible loop heat pipe comprising:

a hollow pipe forming a single loop path for a heat pipe fluid to flow therethrough;

a pair of fill/drain valves connected to the loop path at opposing ends thereof;

a first normally open squib valve coupled the loop heat pipe on one side;

a second normally open squib valve coupled the loop heat pipe on an opposing side;

first and second shaped charges coupled to the loop heat pipe proximate the first and second squib valves;

first and second beam seal joints positioned in the loop heat pipe between the first and second squib valves, respectively;

a first heat exchanger in thermal communication with the loop heat pipe proximate a first end;

a compensation chamber connected with the loop heat pipe positioned to receive thermal input from the first heat exchanger;

a condenser formed within the loop heat pipe proximate a second end opposite of the first end;

an extension pipe in fluid communication with the loop heat pipe, the extension pipe projecting away from the loop heat pipe between the compensation chamber and the second squib valve;

a normally closed third squib valve positioned proximate a connection point between the loop path and the extension pipe;

a flow control valve positioned downstream of the first squib valve in the extension pipe;

a second heat exchanger positioned downstream of the flow control valve in the extension pipe;

a temperature sensor in a closed loop connection between the flow control valve and the second heat exchanger; and a dump vent formed in the extension pipe to permit heat pipe fluid to vent therefrom after the loop heat pipe has been severed by the shaped charges.

18. The frangible loop heat pipe of claim 17 further comprising a pair of opposing vents connected to the ejector nozzle to prevent a net thrust force from ejecting the fluid.

19. A spacecraft system comprising:

a spacecraft having a primary module and one or more separable modules connected thereto;

a frangible loop heat pipe positioned within the primary module and the one or more separable modules;

wherein the frangible loop heat pipe is separable into a primary element and a secondary element;

wherein the primary element remains within the primary module after post staging separation of the spacecraft; and wherein the frangible loop heat pipe includes at least two beam seal joints.

* * * * *